United States Patent [19]
Esmay et al.

[11] 3,774,557
[45] Nov. 27, 1973

[54] PORTABLE SEED PLANTER

[75] Inventors: Paul O. Esmay; Carl B. Derr, both of Bristol, Ind.

[73] Assignee: Esmay Products, Inc., Bristol, Ind.

[22] Filed: Nov. 12, 1970

[21] Appl. No.: 88,817

[52] U.S. Cl.................... 111/82, 111/86, 172/150, 172/126
[51] Int. Cl.............................................. A01c 5/00
[58] Field of Search.................. 111/85, 82, 77, 61, 111/79, 86, 87; 172/356, 351, 365, 364, 256, 258

[56] References Cited
UNITED STATES PATENTS

| | | | |
|---|---|---|---|
| 988,539 | 4/1911 | Balint | 111/86 |
| 298,880 | 4/1884 | Newton | 111/61 |
| 1,443,342 | 1/1923 | Cabrini | 111/79 |
| 2,884,880 | 5/1959 | Miller | 111/85 |
| 1,171,886 | 2/1916 | Ray | 111/82 X |
| 3,219,000 | 11/1965 | Leach et al. | 111/77 |
| 1,841,236 | 1/1932 | Zaback | 111/85 |
| 2,924,186 | 2/1960 | Landeen | 111/82 X |

FOREIGN PATENTS OR APPLICATIONS

| | | | |
|---|---|---|---|
| 777,443 | 2/1935 | France | 172/365 |

*Primary Examiner*—Robert E. Pulfrey
*Assistant Examiner*—Stephen C. Pellegrino
*Attorney*—Wallenstein, Spangenberg, Hattis & Strampel

[57] ABSTRACT

A portable hand-pushable seed planter including a single front wheel and a single rear wheel carried on the base portion of a frame, the front wheel having a peripheral rib extending radially therefrom which, when the planter is manually propelled, pushes relatively deeply into the ground to form a furrow for relatively small seeds. Extending upwardly from the base portion of the frame are side frame members between which a seed hopper is supported. The seed hopper has means for sequentially delivering seeds to a seed discharge opening where the seeds drop by force of gravity into a seed discharge tube which drops the seeds into a furrow formed by the rib on the front wheel. The seed discharge tube carries a vertically adjustable shoe on the bottom thereof which in its lowered position makes a furrow in the ground of a greater width and depth than the furrow formed by the rib on the front wheel for relatively large seeds. A handle located rearwardly of the rear wheel connects to the frame at a point between and spaced horizontally a substantial distance from both wheels so a downward force on the handle is applied substantially to both wheels.

10 Claims, 20 Drawing Figures

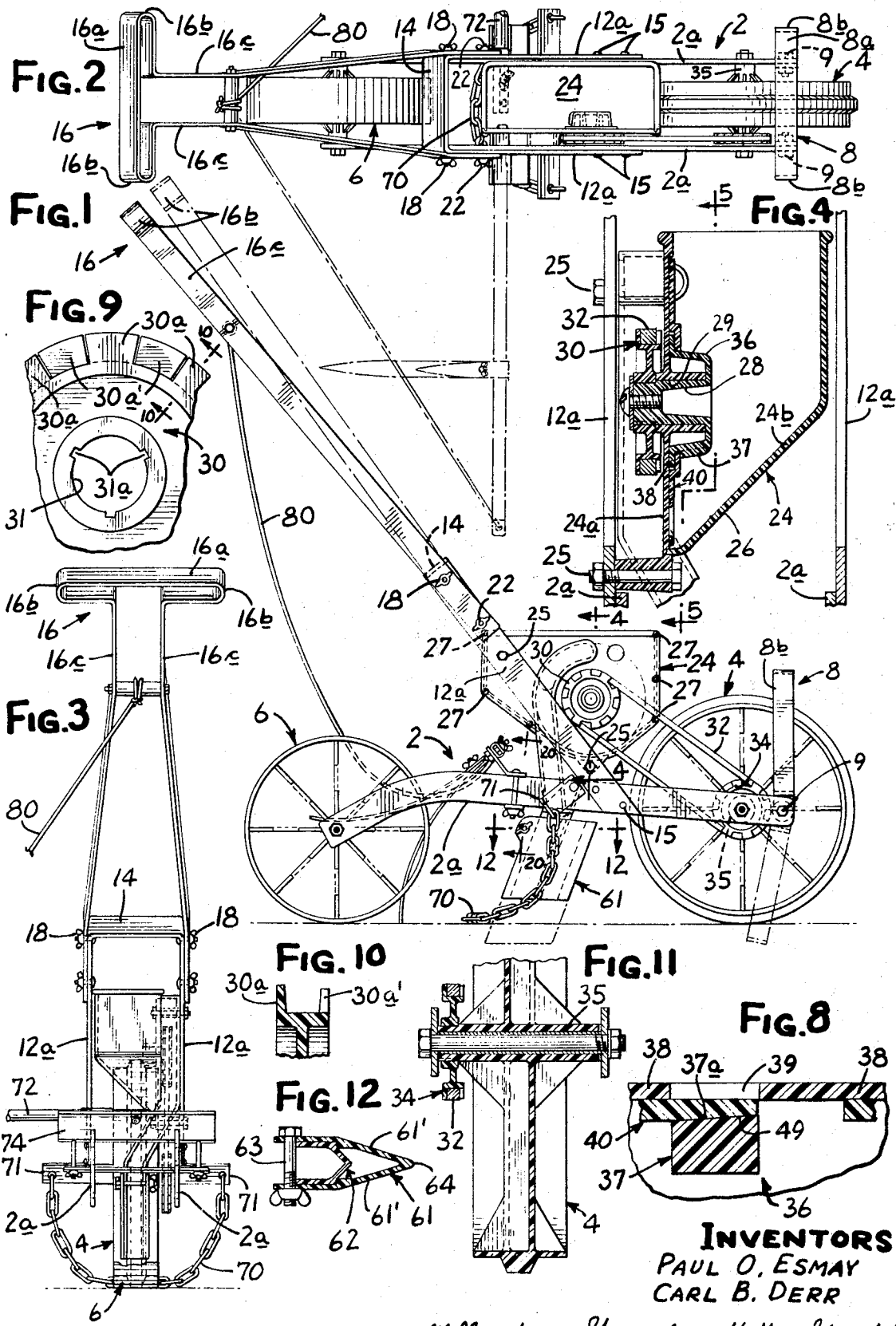

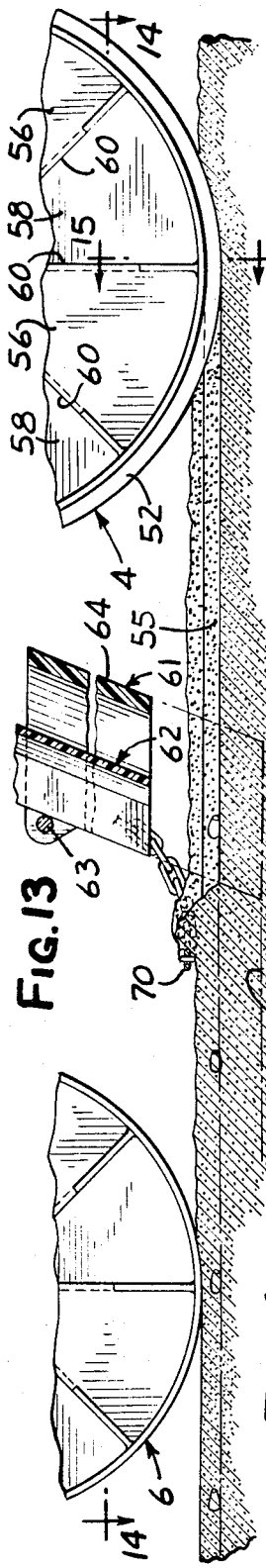

INVENTORS
PAUL O. ESMAY
CARL B. DERR
ATTYS.

PORTABLE SEED PLANTER

This invention relates to portable seed planters which have their most important application as home garden planters adapted to plant seeds of varying size and with a proper variable spacing in a furrow formed by a portion of the planters as they are pushed along the ground.

More particularly, the present invention is an improvement over the type of seed planter disclosed in U.S. Pat. No. 2,302,056 which includes a frame with a pair of aligned front and rear wheels. The rotatable seed scooping plate disclosed in this patent is driven by the movement of the front wheel. The seed scooping plate which is mounted in hopper supported on the frame between the front and rear wheels, has spaced cup-shaped projections which scoop-up seeds in the bottom of the hopper and deliver them sequentially to a seed discharge tube which drops the seeds with the desired spacing into a furrow formed by projecting portions of a shoe carried at the bottom of the seed discharge chute. The spacing of the seeds is varied by replacing a given seed scooping plate by another plate with differently spaced cup-shaped projections. The seeder has a pair of wheelbarrow-type handles extending upwardly and rearwardly from the front portion of the frame. With this and other similar feed planters of the prior art, it was very difficult to push, change the seed scooping plates, and dig furrows of regular depth, and the planters were relatively bulky, heavy and costly to manufacture.

The preferred form of the present invention overcomes all these disadvantages by being a relatively light-in-weight inexpensive to construct and easy to push seed planter which forms furrows of consistent depth even where the ground is bumpy and further wherein the seed scooping plates referred to can be quickly and easily changed. Moreover, in the preferred form of the invention, as the seed planter transverses a given path, it forms a well-defined flat bottomed furrow selectively of either a relatively narrow and shallow or relatively wide and deep configuration, marks the next row to be seeded, drops and spaces the seeds in the furrow, covers the furrow with loose dirt and then packs the loose dirt to complete the planting operation.

In accordance with one of the features of the present invention, except for the very largest seeds, the furrow is formed by rib means projecting from the periphery of a front wheel of the seed planter which rib means pushes into the ground as the seed planter is propelled. The wheel is relatively flat on opposite sides of the rib so this portion of the wheel rides near the surface of the ground to form substantial bearing surfaces for supporting the weight of the seed planter and packing the dirt about the furrow to form well defined self-supporting side walls. The depth of the furrow formed by the rib means projecting from the front wheel varies only to a small degree, if at all, as the front wheel rides over irregularities in the ground. Thus, any variation in the elevation of the rear wheel or wheels as the same moves over bumpy ground does not change the depth of the furrow, unlike the garden planters of the prior art described above.

In accordance with another feature of the invention, a handle bar having a depending shank portion is supported for limited pivotal movement to the frame of the seed planter so up and down movement of the user grasping the handle bar which could cause the front wheel to pivot up and down with respect to the rear wheels is decoupled to some extent from the seed planter frame, to aid in maintaining a constant furrow depth.

For the very largest seeds, a furrow-forming shoe vertically adjustable in elevation may be carried on the bottom of a seed discharge tube depending from the seed hopper to cut a deeper and wider furrow than that formed by the rib on the front wheel of the seed planter.

The seed planter, which preferably is light-in-weight and comprises only a single pair of wheels (namely, longitudinally aligned front and rear wheels) most advantageously has a chain or the like dragging along the ground behind the seed discharge tube so it pushes loose dirt into the furrow, and the rear wheel packs the loose dirt in the furrow as it rides thereover. As the user grasps the handle bar and pushes the seed planter, he exerts both downward and forward components of force thereon. The handle bar is connected to the frame of the seed planter at a point between and substantially spaced from both front and rear wheels, so the downward component of force is distributed substantially upon the front and rear wheels to prevent rocking of the seed planter on the front or rear wheels and to insure significant down pressure on both wheels to aid in pushing the rib of the front wheel into the ground and in forcing the rear wheel against the loose soil covering the furrow to pack the same.

The above and other features and advantages of the invention will become apparent upon making reference to the specification to follow, the claims and the drawings wherein:

FIG. 1 is a side elevational view of an exemplary seed planter of the present invention;

FIG. 2 is a top plan view of the seed planter of FIG. 1;

FIG. 3 is a rear end view of the seed planter of FIGS. 1 and 2, with a portion of the rear wheel broken away;

FIG. 4 is an enlarged vertical sectional view of the seed hopper of FIG. 1, taken along section line 4—4 therein;

FIG. 5 is a vertical sectional view of the seed hopper portion of FIG. 4, taken along section line 5—5 therein;

FIG. 6 is an enlarged vertical sectional view through a portion of FIG. 5, taken along section line 6—6 therein;

FIG. 7 is a sectional view of a portion of FIG. 5 taken along section line 7—7 therein;

FIG. 8 is a sectional view through a portion of FIG. 5, taken along section line 8—8 therein;

FIG. 9 is a fragmentary side elevational view of one of the pulley wheels forming part of the seed planter of FIGS. 1-4;

FIG. 10 is a sectional view of the pulley wheel of FIG. 8, taken along section line 10—10 therein;

FIG. 11 is an enlarged transverse sectional view through the front wheel of the seed planter shown in FIGS. 1 and 2;

FIG. 12 is a horizontal sectional view through a portion of the seed planter shown in FIG. 1, taken along section line 12—12 thereof, and shows part of a seed discharge chute and furrow-forming shoe thereof;

FIG. 13 is a fragmentary vertical sectional view through the bottom portion of the seed planter of FIGS. 1-5 and the furrow formed by the rib on the front wheel of the seed planter;

FIG. 14 is a horizontal sectional view of the portion of the seed planter shown in FIG. 13, taken along section line 14—14 therein;

FIG. 15 is a transverse sectional view through the front wheel of the seed planter shown in FIG. 13, taken along section line 15—15 therein;

FIG. 16 is a side view of a seed scooping plate which can be substituted for the seed scooping plate shown in FIG. 5;

Figure 17:
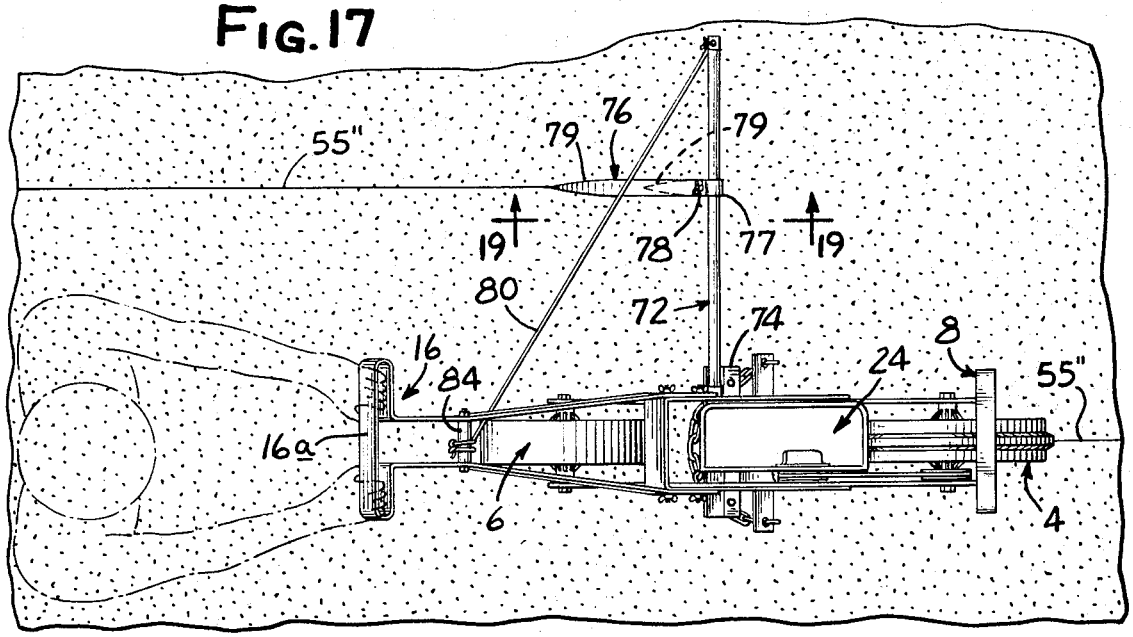
FIG. 17 is a top plan view of the seed planter of FIGS. 1–5 as it is being pushed along the ground, with a portion of the seed planter marking a line indicating the location of the next path to be transversed by the seed planter.

Referring now to the drawings showing a preferred exemplary form of the invention, the seed planter there shown includes a base frame assembly generally indicated by reference numeral 2 having generally horizontally extending, laterally spaced side frame members 2a—2a carrying a single front wheel 4 rotatably mounted between the front end portions of the side frame members 2a—2a, and a single rear wheel 6 rotatably supported between the rear end portions of the side frame members 2a—2a. The center points of the front and rear wheels 4 and 6 are in longitudinal alignment in a common vertical plane containing the center of gravity of the seed planter. A kick-stand 8 is pivotally mounted by aligned pivot bolt assemblies 9—9 to the front end portion of the side frame members 2a—2a, the kick-stand having a flat laterally extending horizontal portion 8a which rests upon the ground when the kick-stand is in its lowered seed planter supporting position and side arms 8b—8b having offset inner end portions rotatably connected to the inner faces of the side frame members 2a—2a. The pivot bolt assemblies 9—9 include friction washers (not shown) permitting the kick-stand to remain in any of its adjusted positions between the uppermost position shown in FIG. 1 where the kick-stand is spaced above the front wheel 4 and its lowered position shown in dashed lines therein.

Extending upwardly and rearwardly from intermediate portions of the side frame members 2a—2a are a pair of side bars 12a—12a terminating at the top in a cross bar 14. The bottom ends of the side bars 12a—12a are anchored by screws 15 or the like to the outer faces of the side frame members 2a—2a at a point between and substantially horizontally spaced from the axes of rotation of the front and rear wheels for reasons to be explained. Secured to the upper extremities of the side bars 12a—12a is a handle-forming unit 16 which may take a variety of forms but, as illustrated, includes a handle bar 16a positioned at an elevation where the user can grasp the same comfortably with both hands (FIGS. 17 and 18) with his arms extending comfortably downwardly and forwardly. The handle bar 16a terminates at the lateral ends thereof in inwardly curving portions 16b—16b in turn joining a pair of downwardly and forwardly inclining shank-forming side arms 16c—16c passing over the flat outer faces of the upper extremities of the side bars 12a—12a. An upper pair of pivot-forming nut and bolt assemblies 18—18 secure the side arms 16c—16c to the side bars 12a—12a, permitting the handle-forming unit 16 to be rocked forwards and backwards over a limited angle. The extent of the rocking motion permitted is determined by the extremities of elongated arcuate slots 20—20 formed in side bars 12a—12a and curving about the rocking axes of handle-forming unit 16. The shank portions of a pair of bolts 22—22 pass through the side arms 16c—16c and the slots 20—20 and are movable within the slots 20—20.

The handle-forming unit 16 is mounted for limited rocking movement as described to de-couple the upward and downward movement of the user as he walks to propel the seed planter. The seed planter is preferably a relatively light-in-weight assembly which increases the possibility that the upward and downward movement of the user can rock the base frame and the wheels carried thereby. The possibility that the forces applied to the handle bar 16 by the user will rock the frame on the front or rear wheels of the seed planter is further limited by the fact that the downward component of these forces are applied to the base frame at points between and substantially horizontally spaced from the portions of the front and rear wheels engaging the ground at which location fulcrums for the possible pivoting or rocking of the frame are formed. The magnitude of the largest rocking couple applied to these fulcrum locations is minimized by the connection of side bars 12a—12a to the base portion of the frame at the points referred to, and the downward component of force desirably applied by the user against the handle bar 16a is thereby applied to a substantial extent to both the front and rear wheels, which is important for reasons to be explained. (For example, if the side bars 12a—12a were to be connected to the base portion of the frame, for example, at the front axis of the front wheel, a relatively large tilting couple is applied to the front or rear wheels by an upward force on the handle bar because of the long lever arm extending between the wheels.)

A seed hopper 24 is secured by suitable fastening screws 25 between the side bars 12a—12a. As illustrated in FIG. 4, the seed hopper is made of two molded synthetic plastic parts 24a and 24b secured together by screws 27 (FIG. 1) or the like. The seed hopper 24 has an inclined bottom wall 26 which directs seeds to the bottom portion of the hopper 24 adjacent the synthetic plastic part 24a forming a vertical wall on one side of the hopper. A shaft member 28 is rotatably supported in an opening 29 in the wall 24a and projects from both sides of the hopper part or wall 24a. A pulley wheel 30 is removably connected to the shaft member 28 on the outside of the hopper part or wall 24a and receives one end portion of a belt 32 whose other end portion extends around a similar pulley wheel 34 which is anchored to a shaft 35 forming an integral part of the front wheel 4. The pulley wheel has a keyway 31a (FIG. 9) formed in a central opening 31 which receives the correspondingly shaped shaft member 28. To reduce the cost of the seed planter, the sprocket wheels 30 and 34 as well as the front and rear wheels 4 and 6 are uniquely constructed so that they can be molded in relatively inexpensive molds out of a suitable synthetic plastic material.

FIGS. 9 and 10 best illustrate the construction of the pulley wheel 30 to which particular reference should now be made. (It is understood that the wheel 34 is similarly constructed.) The belt-receiving groove of the pulley wheel 30 is defined between a series of circumferentially spaced projections 30a projecting radially outwardly on one axial side of the sprocket 30 and a series of similar circumferentially spaced projections 30a' formed on the opposite side of the pulley wheel 30 and angularly displaced from the projections 30a on the opposite side of the pulley wheel so they are positioned opposite the spaced between the projections 30a. The confronting inner surfaces of the projections 30a and 30a' taper slightly inwardly and frictionally receives the belt 32 in space therebetween. The belt 32 may be of rectangular cross section rather than the conventional V-shaped cross section. The construction of the pulley wheel just described enables the pulley wheel to be made from a single piece mold since the pulley wheel can be moved axially out of the mold because of the angularly offset projections 30a and 30a' forming the pulley groove.

The shaft member 28 has a hub portion 36 (FIG. 4) with a flange 38 adjacent the inside of the seed hooper part or wall 24a, the flange having circumferentially spaced openings 39. The hub portion 36 has circumferentially spaced projections 37 opposite the openings 39, the projections having inwardly facing tapered surfaces 37a (FIG. 8) spaced outwardly from the plane of the adjacent surface of the flange to receive by wedging action any one of a selected number of seed scooping plates 40, 40', etc. These seed scooping plates have circumferentially spaced cupshaped projections 41, 41', etc. extending from the side of the plates to face away from the hopper part or wall 24a (FIGS. 5 and 16) confront seed passage openings 42, 42', etc. on the bodies of the plates. The cup-shaped projections 41, 41', etc. on the various plates 40, 40', etc. are of various sizes and spacings to accommodate different sized seeds which are to be spaced different distances in accordance with their size in a furrow to be formed by a portion of the seed planter device to be described.

When the cup-shaped projection of the selected seed scooping plate reaches the bottom portion of the hopper (FIG. 1), it scoops up a seed or seeds which are held in the space between the cup-shaped projection and the contiguous hopper part or wall 24a. In the upper portion of the hopper part or wall 24a opposite the path of movement of the cup-shaped projections 41, 41', etc. of the seed scooping plate involved is an arcuate opening 44. Each of the cup-shaped projections 41, 41', etc. referred to, when brought to a point about in the middle portion of the hopper, presents a sloping bottom wall brought opposite the end of the opening 44 so that the seed or seeds therein fall by force of gravity, where the seed or seeds pass into a seed discharge chute 46 which extends down to a point near the ground where the seed or seeds fall within a furrow. The spacing of the seeds placed in the furrow is a function of the relative diameters of the pulley wheels 30 and 34 (which are identical in the example of the invention being described) and the angular spacing of the cup-shaped projections in the selected seed scooping plate.

Each seed scooping plate, which may be made of a molded synthetic plastic material, includes a central opening 50 (FIG. 16) having circumferentially spaced openings 48 adapted to receive the projections 37 of the hub portion 36 of the shaft member 28 and outwardly facing inclined surfaces 49 adapted, when the plate involved is rotated in one direction with respect to the projections 37, to form a wedging fit beneath the corresponding surfaces 37a, of the projections. Rotating the seed scooping plate involved in the opposite direction with respect to the hub portion of the shaft member 28 loosens the joint to enable removal of the seed scooping plate involved. The above described connection or joint between the hub portion 36 of the shaft member and the selected seed scooping plate is a bayonet-type joint.

The front wheel 4 has a central radially extending rib 52 with outwardly tapering side margins 52a terminating in a flat outer margin 52b. The base of the rib 52 joins on the opposite sides thereof relatively flat side marginal portion 54—54 which distribute the weight of the seed planter as the wheel rides on or near the surface of the ground while the rib 52 is pushed deeply into the ground to form a furrow 55 (FIG. 13). The downward force of the side marginal portions 54—54 on the ground compresses the soil at the side margins of the furrow 55 so the furrow is well defined and self-supporting.

The peripheral portion of the wheel 4 join a first series of circumferential-spaced segmental wall portions 56 located on one side of the center plane of the wheel 4 and similar segmental wall portions 58 on the opposite side of the center plane of the wheel 4. The side margins of the various segmental wall portions 56 and 58 connect with the peripheral portion of the wheel by radial ribs 60. This wheel construction forms an exceedingly rigid wheel while using a minimum amount of synethic plastic material in the molding thereof. The rear wheel 6 is constructed, except for its size and the flat shape of the entire periphery thereof, in a similar way to the front wheel 4, so a further description of the rear wheel 6 will not be given.

The peripheral rib 52 of the front wheel 4 forms a flat bottomed furrow 55 of consistent depth and of a size to accommodate the smaller range of seeds, such as radishes and beet seeds which lie on the flat bottom of the furrow so these seeds will be positioned at a consistent depth below the surface of the ground. To form a furrow 55' for the larger seeds, a furrow-forming shoe 61 is adjustably supported around the bottom portion of the seed discharge chute 46. The furrow-forming shoe 61 has a vertical channel therethrough to permit the same to be slid over the bottom portion of the slide discharge chute 62. The furrow-forming shoe 61 thus has a pair of opposite side walls 61' and 61' (FIG. 12) extending outwardly and rearwardly and intersecting at the front of the shoe to form a furrow-forming edge 64 around the chute 62. When planting seeds which fit into the smaller furrow 55, the furrow-forming shoe is secured at an elevation above the surface of the ground. However, for larger seeds, such as corn, beans and pea seeds requiring deeper planting, the furrow-forming member 62 is lowered the proper distance below the bottom of the rib on the front wheel 4. Clamping means, such as a clamping unit and bolt assembly 63 is provided extending between the rear ends of the side walls to lock the shoe 61 in the adjusted position thereof.

Means are provided for pushing the loose soil into the furrow behind the seed discharge chute 62. This means includes a laterally extending chain 70 dragging on the ground. The ends of the chain 70 are secured to the projecting ends of a laterally extending member 71 projecting laterally beyond the side frame members 2a—2a at an elevation just below the same so the member 71 will not readily contact any high mound of dirt which may be present. The chain 70 dragging along the ground pushes loose dirt into the furrow formed in front of the same. This loose dirt is then compacted by the movement of the flat outer periphery of the rear wheel 6 over the loose dirt pushed into the furrow.

Figure 18:
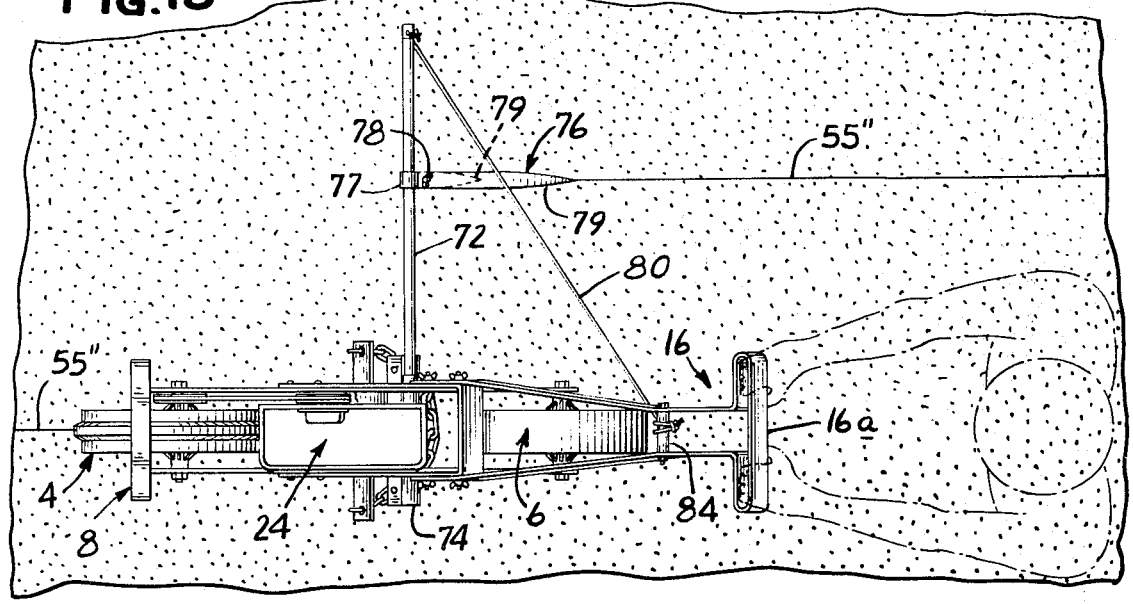
FIG. 18 shows the seed planter being pushed along the path marked in FIG. 17, with a portion thereof marking a line indicating the next path to be traversed by the seed planter.
Figure 19:
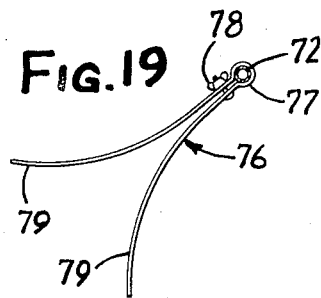
FIG. 19 is a sectional view of FIG. 17 taken along section line 19—19 therein.
Figure 20:
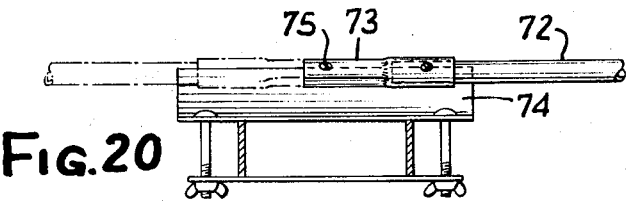
FIG. 20 is an enlarged sectional view through a portion of the seed planter of FIG. 1, taken along section line 20—20 therein.

The seed planter, in addition to all of the other functions just described, also marks a shallow indentation 55' (FIG. 17) in the ground to mark the next path to be traversed by the wheels of the seed planter. This means includes the marker-supporting rod 72 which is secured to a coupling member 73 (FIG. 20) in turn pivotally mounted by a pivot bolt 75 upon a cross frame member 74. Laterally adjustably disposed along the rod 72 is a row marker member 76 having a split cylindrical hub portion 77 slidable along the rod 72 and bolt and wing nut clamping means 78 for clamping the hub portion in an adjusted position on the rod 72. Extending from the hub portion 77 are a pair of outwardly diverging vertically spaced marker blades 79—79 the bottom one of which digs into the ground to form the indentation 55'' which marks the next path to be traversed by the seed planter. When the seed planter has reached the end of a given row marked by an indentation 55'', the rod 72 is pivoted to the opposite side of the seed planter to bring the blade 79 previously above the digging blade 79 into position to mark the next row, as best shown in FIG. 18. The rod 72 is pivoted by pulling on a rope 80 secured at one end to the rod 72 and at the other end to a crossbar 84 extending between the upper portions of the side arms 16c—16c of the handle-forming unit 16.

The preferred exemplary form of the invention just described thus provides an exceedingly simple and easy to operate hand pushable seed planting unit which simultaneously forms a furrow of proper size, pushes loose dirt into the furrow, packs the loose dirt within the furrow and marks the next row to be traversed thereby in a single pass of the seed planter over a given path. It also includes a seed scooping plate mounting which permits the quick and easy change of a seed scooping plate to accommodate different seeds.

It should be understood that numerous modifications may be made in the most preferred form of the invention and drawings just described without deviating from the broader aspects thereof.

We claim:

1. In a hand-pushable seed planter including a frame carrying front and rear wheels anchored to the frame to rotate about fixed axes of rotation thereon and to transfer the weight of and forces applied to the planter to the soil beneath, handle means on the frame for pushing the planter device and a seed-receiving hopper between said front and rear wheels with seed delivery means therein for sequentially delivering seeds to a seed discharge opening, a seed discharge chute extending from said seed discharge opening to drop the seeds sequentially fed thereto at spaced points in a furrow, furrow covering means behind said seed discharge thereto for covering the furrow, and handle means for propelling the seed planter, the improvement in furrow-forming means for forming a furrow ahead of said chute in which the seeds dropping from said chute are deposited, said furrow-forming means including first means which is part of said front wheel carried by said frame and aligned with the bottom of said chute, said front wheel having a ground engaging periphery with relatively flat portions which ride on the surface of the ground, said first means including radially outwardly projecting rib means on the periphery of said front wheel which rib means, due to the downward force applied thereto, is pushed into the ground and forms a relatively narrow furrow into which the seeds involved drop, aid rib means having a flat periphery so the furrow has a flat bottom of a width at least equal to the corresponding width of the largest seed to be dropped therein, second means behind the seed delivery means which second means is vertically adjustable between an elevation where it does not contact the ground so the rib means on the front wheel is effective in forming a furrow for smaller seeds, the second means in its lowered position digging into the ground to cut a furrow of a greater width and depth than the furrow formed by said rib means so that the furrow of the seed planter can accommodate larger seeds.

2. The portable seed planter device of claim 1 wherein said rib means is a continuous rib on the wheel periphery.

3. The seed planter of claim 1 wherein said relatively flat portions of the front wheel are on opposite sides of said rib means where they exert a downward force to help compact the soil lining both sides of the furrow, to form a furrow with well-defined, self-supporting side walls.

4. The seed planter of claim 1 wherein said front wheel with said rib means is the only front wheel on said frame.

5. The seed planter of claim 1 wherein said planter has only one rear wheel aligned longitudinally with said only front wheel, and there is provided behind said seed discharge opening furrow-covering means which drags on the ground behind said second means and pushes loose soil into the furrow formed by said rib means of said front wheel, said rear wheel riding over the loose dirt pushed into said furrow by said furrow-covering means to pack the soil pushed into said furrow.

6. The seed planter of claim 5 wherein the handle means connects to said frame at a point between and substantially spaced from said front and rear wheels so a downward force applied to said handle means is substantially distributed between said front and rear wheels to aid in pushing the rib means of said front wheel into the ground and to aid said rear wheel in compacting the loose soil pushed into said furrow.

7. In a hand-pushable seed planter including a frame having only one front wheel and only one rear sheel in longitudinal alignment with said only front wheel, a seed-receiving hopper between said front and rear wheels with seed delivering means therein for sequentially delivering seeds to a seed discharge opening, and a seed discharge chute extending from said seed discharge opening to drop the seeds sequentially fed thereto at spaced points in a furrow, means coupling the motion of one of said wheels to said seed delivery means to operate the same as the seed planter is moved along the ground, the furrow-forming means which forms a furrow in the ground in alignment with said front and rear wheels as the seed planter device is moved along the ground, the improvement comprising: means dragging on the ground behind said furrow-forming means for pushing loose soil into the furrow formed by said furrow-forming means, and handle means to be grasped by the operator for propelling the seed planter device along the ground, said handle means being supported at such an elevation and is so positioned rearwardly of the rear sheel so the user can grab the handle means where his arms extend downwardly comfortably from his shoulders where the operator can easily and comfortably exert both a forward and downward component of force against the handle means, said handle means having depending shank means with means for pivotally securing the same to the frame at a point between and substantially horizontally spaced from the front and rear wheels so as to pivot over a limited angle about a horizontally extending lateral axis, so the handle can be held in a position where a small back and forth rocking motion of the handle means caused by the movement of the operator propelling the same is not effective in rocking said seed planter on said front and rear wheels, and wherein said downward force applied to the handle means is distributed substantially upon both said front and rear wheels in a manner to inhibit any rocking of the seed planter device on one or the other of the wheels and so that the downward force aids the rear wheel in packing said loose soil pushed over the furrow.

8. The seed planter of base claim 7 wherein there is only one front wheel and only one rear wheel longitudinally in alignment with said only front wheel.

9. The seed planter of claim 7 wherein said shank means of the handle means is pivotally connected to said frame at a point between and substantially horizontally spaced from said front and rear wheels.

10. In a seed planter including a frame having front wheel means and rear wheel means, a seed receiving hopper on said frame, a seed discharge chute extending from said hopper and having a seed passageway of a size to accommodate seeds of a variety of sizes, seed delivery means for causing seeds sequentially to drop from said hopper and pass through said passageway of said seed discharge chute where the seeds are deposited at spaced points in a furrow, means coupling the motion of said wheel means to said seed delivery means to operate the same as the seed planter is moved along the ground, and flexible soil-pushing means positioned behind said seed discharge chute and adapted to drag on the ground to push loose soil piled up on the sides of the furrow into the furrow formed ahead of the same, the improvement comprising furrow-forming means including a furrow-forming shoe means on the bottom of said seed discharge chute, which shoe means defines a seed passageway which forms a downward continuation of said passageway of said seed discharge chute, means for supporting said furrow-forming means on said seed discharge chute for vertical adjustment into a number of selected positions so the bottom of the shoe means projects varying distances below the plane of said front and rear wheel means to form a furrow of a desired depth and of a width greater than that of said soil-pushing means, said furrow-forming shoe means has front and bottom ground digging surface means for abruptly contacting the ground to minimize the magnitude of earth compacting forces to leave loose soil in the furrow, and the leading edge of said furrow-forming shoe being pointed edge means immediately adjacent to the seed discharge chute for minimizing earth piling forces to leave loose soil inside the furrow whereby as the seeds are dropped into the furrow formed by the furrow-forming shoe loose dirt falls upon said seeds in the furrow before said soil-pushing means can pass over the furrow.

\* \* \* \* \*